United States Patent
Kamiya et al.

(10) Patent No.: US 9,477,213 B2
(45) Date of Patent: Oct. 25, 2016

(54) SHEET PUNCHING DEVICE WITH HUMIDIFIER

(71) Applicant: KONICA MINOLTA, INC., Tokyo (JP)

(72) Inventors: Masahiro Kamiya, Toyohashi (JP); Takeshi Tamada, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 657 days.

(21) Appl. No.: 13/911,359

(22) Filed: Jun. 6, 2013

(65) Prior Publication Data

US 2013/0331246 A1 Dec. 12, 2013

(30) Foreign Application Priority Data

Jun. 11, 2012 (JP) ................ 2012-131825

(51) Int. Cl.
G05B 13/00 (2006.01)
G03G 15/00 (2006.01)

(52) U.S. Cl.
CPC .......... *G05B 13/00* (2013.01); *G03G 15/6582* (2013.01); *G03G 2215/00814* (2013.01)

(58) Field of Classification Search
CPC .......... B65H 2301/5152; G03G 2215/00818; G03G 15/6582; G05B 13/00
USPC ......................................... 270/58.07, 52.17
See application file for complete search history.

(56) References Cited

U.S. PATENT DOCUMENTS

| | | | | |
|---|---|---|---|---|
| 5,377,964 A * | 1/1995 | Haller | ............... | B41F 13/56 270/21.1 |
| 5,628,502 A * | 5/1997 | Amarakoon | .......... | B26D 7/015 270/58.07 |
| 5,685,532 A * | 11/1997 | Amarakoon | ............. | B26F 1/08 270/58.07 |
| 6,325,585 B1 * | 12/2001 | Sasaki | .................... | B26D 7/24 101/485 |
| 6,719,283 B2 * | 4/2004 | Tsuchiya | ............... | B65H 29/12 270/58.07 |
| 6,783,124 B2 * | 8/2004 | Tamura | ............... | B26D 7/2628 270/58.07 |
| 7,407,155 B2 * | 8/2008 | Tamura | .................... | B26D 7/18 270/58.07 |
| 7,950,647 B2 * | 5/2011 | Iguchi | .................... | B21D 28/26 270/58.07 |
| 2003/0210290 A1 * | 11/2003 | Suzuki | .................... | B41J 11/706 347/9 |

FOREIGN PATENT DOCUMENTS

| | | |
|---|---|---|
| JP | 2003-326782 | 11/2003 |
| JP | 2007-136619 | 6/2007 |
| JP | 2008-02439 A | 2/2008 |
| JP | 2008-024379 | 2/2008 |
| JP | 2008-230814 | 10/2008 |
| JP | 2011-090243 | 5/2011 |
| JP | 2011090243 | 5/2011 |
| JP | 2011090243 A * | 5/2011 |

OTHER PUBLICATIONS

Japanese Office Action, Application No. 2012-131825. Drafting Date: Jul. 9, 2014 and English translation thereof (6 pages).
Decision of Refusal dated Sep. 30, 2014 for corresponding Japanese Patent Application No. 2012-131825.
Office Action dated May 5, 2015 from the corresponding Chinese Patent Application No. 201310223655.0.
English translation of the Office Action dated May 5, 2015 from the corresponding Chinese Patent Application No. 201310223655.0.

* cited by examiner

*Primary Examiner* — Patrick Mackey
(74) *Attorney, Agent, or Firm* — Lucas & Mercanti, LLP

(57) ABSTRACT

A sheet processing apparatus is described which is used to process a sheet transferred from an image forming apparatus such as a copying machine. A sheet processing apparatus is provided with a punching unit which cuts off part of a sheet conveyed along a conveying route, and a humidifying unit located on this conveying route in the upstream side of the punching unit and configured to humidify a predetermined area which is selected from the entire area of the sheet and includes punch areas to be cut off from the conveyed sheet by the punching unit. The cutting wastes can thereby be electrostatically discharged without leaving the sheet excessively wet.

11 Claims, 5 Drawing Sheets

SHEET PUNCHING DEVICE WITH HUMIDIFIER

CROSS-REFERENCE TO RELATED APPLICATIONS

The present application claims priority under 35 U.S.C. §119 to Japanese Patent Application No. P2012-131825, filed Jun. 11, 2012. The contents of this application are herein incorporated by reference in their entirety.

FIELD OF INVENTION

The present invention relates to a sheet processing apparatus and an image forming system.

DESCRIPTION OF RELATED ART

Heretofore, sheet processing apparatuses are known which are used to perform various processes for sheets. This type of sheet processing apparatus is supplied sheets, for example, from an image forming apparatus which is connected in the upstream side, from some apparatus other than the image forming apparatus, or by hand work. For example, a sheet processing apparatus is provided with a cutter unit which is used to cut off part of a sheet as a cut area in a punching process for opening one or more holes through the sheet near a predetermined side thereof, or a cutting process for cutting a predetermined side of the sheet. Also, after the cutting-off process, the sheet processing apparatus can transfer the processed sheet to the subsequent stage for several post-printing processing such as ring binding, or discharge the processed sheet to an outside tray without further processing.

In this type of a sheet processing apparatus, a cut area (part of a sheet) which is cut off from the sheet by the cutter unit falls as cutting wastes into a box-like container located below the cutter unit and accumulated in the container. Incidentally, the sheet is sometimes electrostatically charged resulting from electricity generated during image formation, or contact frictional charge generated with a conveyance member for conveying the sheet. When arriving at the cutter unit, the charged sheet is cut out to produce charged cutting wastes. In this case, the charged cutting wastes may be scattered and attracted to the peripheral surface of the cutter unit and the side walls of the container, or clustered together and locally heaped in the container. This may result in the disadvantage that the inside of the sheet processing apparatus becomes substantially dirty, that the heap of cutting wastes makes a sensor detect the full state of the container too early.

For example, a hole-punching apparatus for performing a punching process through sheets is described in Japanese Patent Published Application No. 2008-24379. This hole-punching apparatus is proposed to solve the above disadvantage by directly removing static electricity from punching wastes. Specifically, this hole-punching apparatus is provided with a dust box having an inner peripheral surface and a bottom surface, which are entirely covered by a humidifying member with which the humidity in the dust box is maintained approximately at a constant level. The humidifying member is made for example of a foamed material which is full of holes impregnated with a solution consisting of a gel-like material and water.

In addition, the above publication discloses a humidifying means which is provided on a sheet conveying route in the image forming apparatus for humidifying sheets passing therethrough. This humidifying means serves to remove static electricity, which is accumulated on a sheet through frictional contact with a conveyance roller or the like during conveying the sheet, by humidifying the sheet in a conveyance route.

However, in accordance with the technique disclosed in the above publication, while the dust box is kept moist, the cutting wastes is in a charged state just after being cut to fall into the dust box. The cutting wastes may thereby be scattered and attracted to several surfaces, and/or clustered together and locally heaped in the dust box.

On the other hand, in accordance with the technique disclosed in the above publication, a humidifying means is provided on a sheet conveying route in the image forming apparatus to humidify the sheet passing therethrough and surely remove static electricity from, the sheet. However, in order to surely remove static electricity from a sheet, the entire surface of a sheet has to be made wet by the humidifying means which is not specifically described in this publication. When a sheet is made wet throughout the entire surface thereof, excessive moisture tends to remain on the sheet and make the sheet soft so that conveyance troubles such as paper jam becomes likely to occur.

The present invention has been made in order to solve the shortcomings as described above. It is an object of the present invention therefore to provide a sheet processing apparatus which cuts out a sheet and generates cutting wastes from which static electricity is removed without leaving the sheet excessively wet.

SUMMARY OF THE INVENTION

To achieve at least one of the abovementioned objects, a sheet processing apparatus reflecting one aspect of the present invention comprises: a cutter unit configured to cut off a cut area which is part of a sheet conveyed along a conveying route; and a humidifying unit located on said conveying route in the upstream side of said cutter unit and configured to partially humidify said sheet to selectively humidify said cut area.

It is preferred here that said humidifying unit selectively humidifies, from among the entire area of said sheet, only said cut area or a predetermined area of said sheet including said cut area.

Also, it is preferred that said humidifying unit comprises: a pair of rotary members engaged with each other under pressure to form a nip portion therebetween and configured to provide a humidifying liquid for a sheet which is passed between said nip portion; and a supply unit configured to supply said pair of rotary members with said humidifying liquid.

Furthermore, it is preferred that said pair of rotary members are partially engaged in order to form said nip portion which is narrower than the width of the sheet corresponding to said cut area of the sheet.

Furthermore, it is preferred that the sheet processing apparatus further comprises a control unit configured to control said humidifying unit to switch whether to perform a humidifying operation.

Furthermore, it is preferred that the sheet is fed to said cutter unit and then discharged from said cutter unit by a switchback operation, and said control unit performs the humidifying operation when the sheet is fed to said cutter unit.

Furthermore, it is preferred that said control unit performs the humidifying operation also when the sheet is discharged from said cutter unit.

Furthermore, it is preferred that said control unit controls said humidifying unit to switch whether to perform a humidifying operation in accordance with the type of the sheet.

Furthermore, it is preferred that said control unit controls said humidifying unit to switch whether to perform a humidifying operation in accordance with the atmospheric humidity.

Furthermore, it is preferred that the sheet processing apparatus further comprises: a box-like container located below said cutter unit and having an upper opening to receive and accumulate cutting wastes of said cut area which is cut off by said cutter unit; a detector unit located near the top of said container and configured to optically detect that the amount of the cutting wastes accumulated in said container exceeds a predetermined upper limit.

DETAILED DESCRIPTION OF THE PREFERRED EMBODIMENT

First Embodiment

Figure 1:
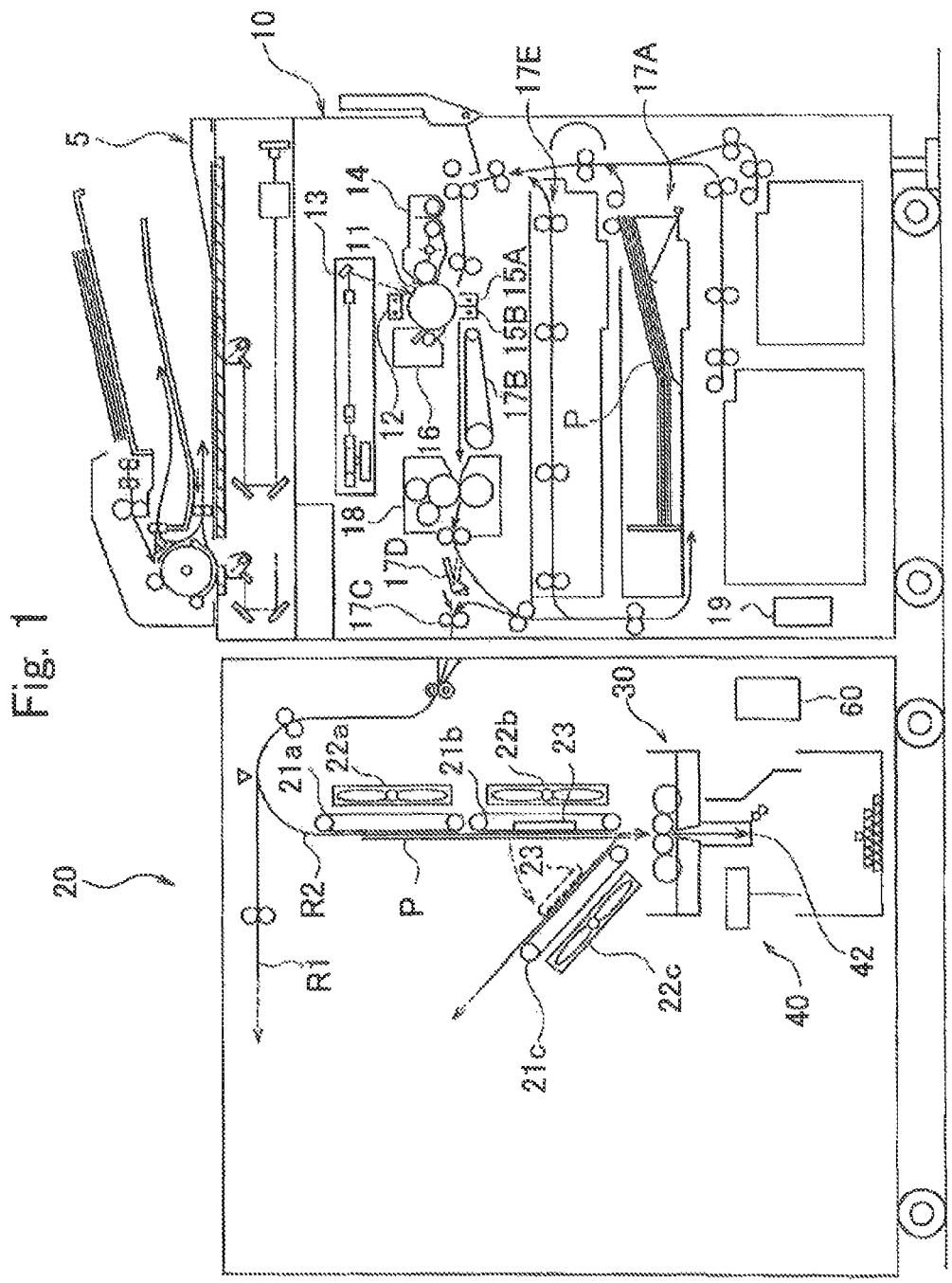
FIG. 1 is an explanatory view for schematically showing the overall configuration of a image forming system in accordance with a first embodiment of the present invention.

FIG. 1 is an explanatory view for schematically showing the overall configuration of the image forming system in accordance with a first embodiment of the present invention. This image forming system includes an image forming apparatus 10 and a sheet processing apparatus 20.

The image forming apparatus 10 is, for example, a copying machine which is provided with an electrophotographic image forming apparatus for forming images on sheets P from an electrostatic image. The image forming apparatus 10 includes an original reading unit 5, a photoreceptor unit 11, a charging unit 12, an image exposure unit 13, a developing unit 14, a transfer unit 15A, a separation unit 15B, a cleaning unit 16, a fixing unit 18 and an image formation control unit 19.

The original reading unit 5 is located on the top of the housing of the image forming apparatus 10, and provided with an automatic document feeder for automatically taking and feeding originals to this feeder when scanning images thereof. This original reading unit 5 reads an image from an original and outputs a predetermined image signal. The output image signal is A/D converted into image data.

The original reading unit 5 is provided with an image reading control unit (not shown in the figure) which processes the image signals by performing shading compensation, dithering, data compression and so on, and stores the processed image signals in an RAM of the image formation control unit 19 as final image data. Incidentally, the image data is not limited to the data as output from the original reading unit 5, but can be the data for example as received from another image forming apparatus, a personal computer or the like connected to the image forming apparatus 1.

The surface of the photoreceptor unit 11 is uniformly charged with electricity by the charging unit 12. The image exposure unit 13 scans and exposes the surface of the photoreceptor unit 11 with laser beams on the basis of the image data in correspondence with the output information which is output from the image formation control unit 19. This process forms latent images on the photoreceptor unit 11 uniformly charged with electricity. The developing unit 14 performs reversal development of the latent image with toner to form a toner image on the surface of the photoreceptor unit 11.

The sheet P stored in a paper tray 17A is fed to the transfer unit 15A. The transfer unit 15A transfers the toner image on the surface of the photoreceptor unit 11 to the sheet P, and then the separation unit 15B separates the sheet P from the photoreceptor unit 11 with the toner images transferred to the sheet P. The intermediate conveyance unit 17B conveys the separated sheet P to the fixing unit 18. The fixing unit 18 performs a fixing process by heating and pressing the sheet P. The discharging unit 17C discharges the sheet P after the fixing process to the sheet processing apparatus 20. On the other hand, the cleaning unit 16 removes toner remaining on the surface of the photoreceptor unit 11 after the transfer unit 15A transfers the toner images to the sheet P.

When images are formed on both sides of the sheet P, a conveying route switch gate 17D is driven to switch the conveyance direction of the sheet P from the direction toward the discharging unit 17C to the downward direction toward the sheet reversing conveyance unit 17E after performing the fixing process of the sheet P by the fixing unit 18. The sheet reversing conveyance unit 17E conveys the sheet P to the transfer unit 15A after reversing the front and back sides of the sheet P by a switchback operation. The transfer unit 15A transfers a toner image to the back side of the sheet P, which is then passed through the fixing unit 18 and supplied from the discharging unit 17C to the sheet processing apparatus 20.

The image formation control unit 19 is responsible for integrally controlling the image forming apparatus 10 and can be implemented with a microcomputer mainly including a CPU, a ROM, a RAM and an I/O interface. The image formation control unit 19 performs various operations in accordance with a control program stored in the ROM and controls the operation of the image forming apparatus 10 on the basis of the operational results.

Also, the image formation control unit 19 can acquire several items of information which are set by users through a manipulation unit which is not shown in the figure. The manipulation unit is located for example on the top of the image forming apparatus 1 and can be implemented for example with a touch panel through which users can perform input operations with reference to information displayed on a screen. The image formation control unit 19 can thereby acquire printing information, i.e., the type of the sheet P, the number of print copies, the density and reduce/enlarge ratio of images, whether to perform a punching process to be described below and so forth. Meanwhile, in place of a touch panel, a personal computer connected to the image forming apparatus 10 may be used as the manipulation unit.

The sheet processing apparatus 20 is located in the subsequent stage of the image forming apparatus 10, and performs a punching process to open one or more through-holes near a predetermined side of a sheet P which is supplied from the image forming apparatus 10. This sheet processing apparatus 20 consists mainly of a humidifying unit 30, a punching unit 40 as a cutter unit and a sheet processing control unit 60. Incidentally, the sheet processing apparatus 20 may have an additional function to further perform another post-printing process of the punched sheet P (for example, a ring binding process for binding a plurality of sheets with predetermined parts).

This sheet processing apparatus 20 receives a sheet P, which is supplied from the image forming apparatus 10, through a sheet receiving unit. The sheet P received through the sheet receiving unit is supplied to a first conveying route R1 or a second conveying route R2 in accordance with a conveying route switch gate (not shown in the figure). The conveying route switch gate is controlled to direct the sheet P to the first conveying route R1 when the sheet P is to be discharged without processing, or to the second conveying route R2 when the sheet P is to be processed by the punching process.

The first conveying route R1 is provided for transferring the sheet P from the sheet receiving unit to a catch tray which is not shown in the figure. For example, a plurality of conveyance rollers are arranged on the first conveying route R1 as a means for conveying the sheet P along this first conveying route R1.

The second conveying route R2 is provided for transferring the sheet P from the sheet receiving unit to the punching unit 40 where the sheet P is punched, and then discharging the punched sheet P to the catch tray. A plurality of conveyance units 21a to 21c are arranged on the second conveying route R2 as a means for conveying the sheet P along this second conveying route R2.

Each of the conveyance units 21a to 21c consists of a drive roller connected to a drive source which is not shown in the figure, non-driven rollers and an air suction belt which rotates to run around these rollers. A number of through-holes having small diameters are formed through the air suction belt. Suction fans 22a to 22c are arranged opposite the conveying route with the air suction belt therebetween. The air suction belt attracts and conveys the sheet P by the use of the suctioning force of the suction fans 22a to 22c.

The sheet P is thereby conveyed by the first conveyance unit 21a located in the sheet receiving side and the second conveyance unit 21b located in the downstream side thereof, passed through the humidifying unit 30, and stopped at the punching unit 40. More specifically, the sheet P is stopped when its leading edge collides with a sheet head stopper which is a part of a die 42 to be described below. Then, in synchronization with the punching process by the punching unit 40, a sheet holding plate 23 pivots from the second conveyance unit 21b to the third conveyance unit 21c located in the downstream side on the conveying route as illustrated with broken line in the figure. The tail of the sheet P is passed from the second conveyance unit 21b to the third conveyance unit 21c by the pivoting motion of this sheet holding plate 23. The third conveyance unit 21c is then driven to rotate to discharge the sheet P from the punching unit 40 in the reverse direction to realize switchback conveyance. The sheet P is therefore transferred to a subsequent stage or the catch tray by the third conveyance unit 21c.

Figure 2:
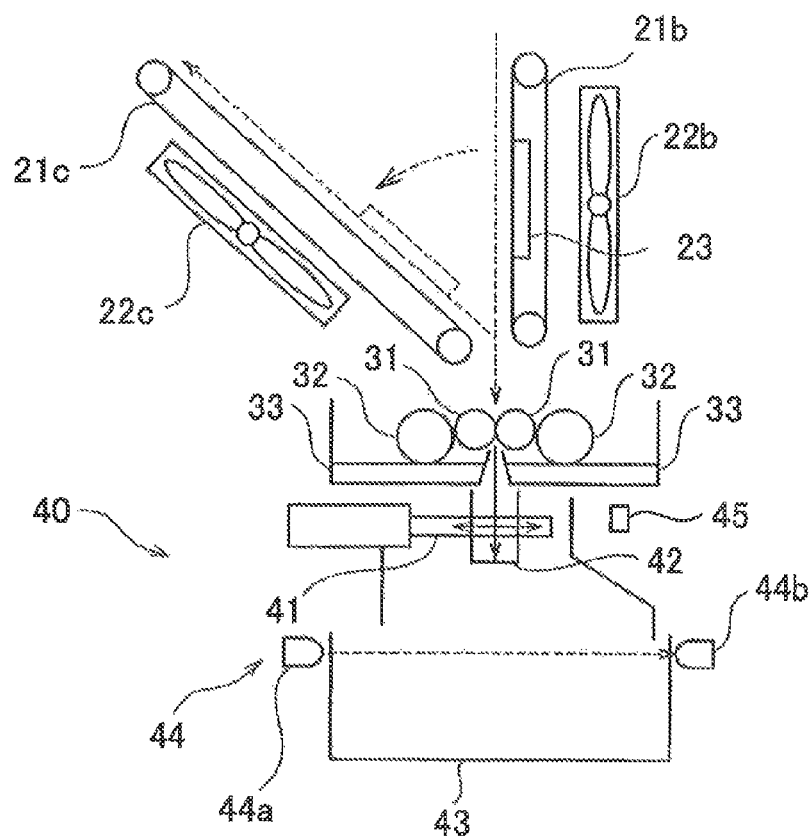
FIG. 2 is an explanatory enlarged view for showing the main portion of the sheet processing apparatus shown in FIG. 1.

FIG. 2 is an explanatory enlarged view for showing the main portion of the sheet processing apparatus 20 shown in FIG. 1. The humidifying unit 30 is located in the upstream side of the punching unit 40 in the conveying route of the sheet P. In this case, for the purpose of determining the location of the humidifying unit 30, "the upstream side of the punching unit 40" is defined with respect to the conveyance of the sheet P toward, the punching unit 40 for performing the punching process. From the view point of the sheet being conveyed after the switchback, the humidifying unit 30 is located in the downstream side of the punching unit 40 on the conveying route of the sheet P. However, the above definition can remove the ambiguity of the upstream/downstream relationship between the humidifying unit 30 and the punching unit 40.

Figure 3:
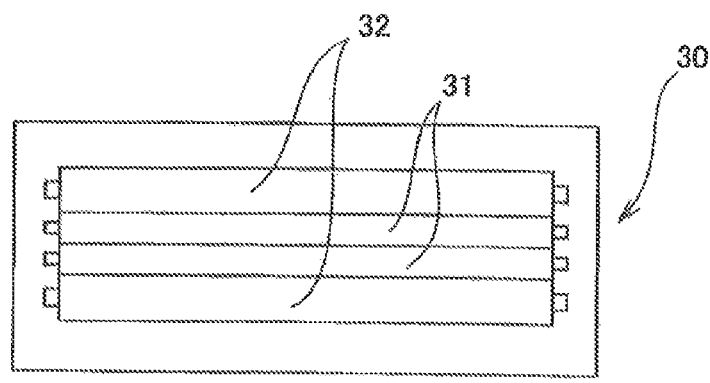
FIG. 3 is a top plan view for schematically showing the configuration of the humidifying unit shown in FIG. 2.

The humidifying unit 30 consists mainly of a pair of humidifying rollers 31 as a pair of rotary members, a pair of water supply rollers 32 and a pair of water baths 33. As illustrated in FIG. 3, the pair of humidifying rollers 31 are engaged with each other under pressure to form a nip portion therebetween located in correspondence with the conveying route of the sheet P. The humidifying rollers 31 are engaged with the water supply rollers 32 respectively. The water supply roller 32 are located in the water baths 33 respectively in order that the cylindrical surfaces of the water supply rollers 32 are placed in a humidifying liquid such as water stored in the water baths 33. The water baths 33 are supplied with water from a water tank, which is not shown in the figure, when needed such that the water baths 33 are filled with an adequate amount of water. The pair of water supply rollers 32 and the pair of water baths 33 serve as a supply unit in combination for supplying water to the pair of humidifying rollers 31.

Water is supplied from the water supply rollers 32 to the humidifying rollers 31 when the humidifying rollers 31 and the water supply rollers 32 rotate as a sheet P is conveyed. Also, when a sheet P is passed between the humidifying rollers 31, water is transferred from the humidifying rollers 31 to the sheet P. The sheet P is thereby made wet from its opposite sides while being conveyed. In this case, when a sheet P is supplied to the punching unit 40, a predetermined area of the sheet P in the leading edge side is passed between the humidifying rollers 31 until the leading edge of the sheet P collides with the sheet head stopper (die 42). On the other hand, when the sheet P is discharged from the punching unit 40, the predetermined area of the sheet P in the tail edge side (corresponding to the leading edge side of the sheet P before colliding with the sheet head stopper) is passed between the humidifying rollers 31 until the tail edge of the sheet P (corresponding to the leading edge of the sheet P before colliding with the sheet head stopper) is passed through the humidifying unit 30.

Figure 4A:
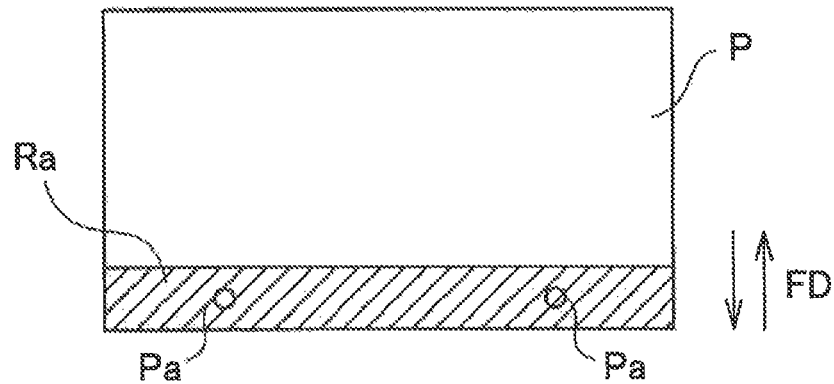
FIG. 4A and FIG. 4B are views for explaining humidification of a sheet.

In the case of the present embodiment, the humidifying rollers 31 have a constant diameter in the sheet width direction perpendicular to a sheet conveying direction FD to continuously form the nip portion in the sheet width direction. As a result, as illustrated in FIG. 4A, the sheet P is made partially wet in a predetermined area Ra which is limited in the sheet conveying direction FD. This predetermined area Ra includes punch areas Pa which are to be cut from the sheet P by the punching unit 40.

Figure 4B:
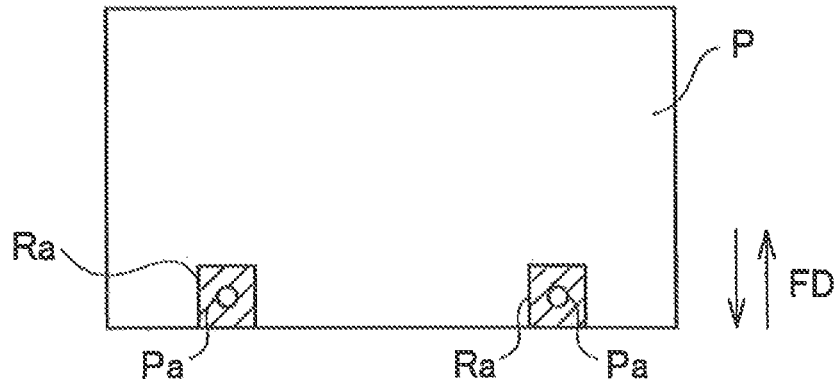

Alternatively, the humidifying rollers 31 can be designed to have different diameters in the sheet width direction to partially engage with each other to form discrete nip portions located in correspondence with the punch areas Pa. In this case, as illustrated in FIG. 4B, predetermined areas Ra of the sheet P are selectively made wet within limited ranges of the entire area of the sheet P both in the sheet conveying direction FD and the sheet width direction. These predetermined areas Ra are formed to contain the punch areas Pa which are to be cut from the sheet P by the punching unit 40.

The humidifying unit 30 can halt the above humidifying operation by changing the positions of the pair of humidifying rollers 31 from engagement positions under pressure to disengagement positions, or disengaging the water supply rollers 32 from the humidifying rollers 31 respectively. Whether to perform the humidifying operation is switchingly controlled by the sheet processing control unit 60 as described below.

The punching unit 40 consists mainly of a punch 41 and a die 42 and serves to cut off punch areas Pa as cut areas of a sheet P. For example, the punch areas Pa are defined as two circular portions which are located distant from, each other near a predetermined side of the sheet P. The punch 41 of this punching unit 40 is provided to move by a drive mechanism which is not shown in the figure, while the dia 42 is fixedly located in a predetermined position. The punch areas Pa are cut by a punching operation, i.e., moving the punch 41 in the perpendicular direction to the surface of the sheet P to thrust the cutting edge of the punch 41 into the dia 42.

The punch areas Pa cut by the punch 41 fall down and accumulated as cutting wastes in a container 43 which is located below the dia 42. The container 43 is a box-like container having an upper opening. The container 43 is provided with an upper limit sensor 44 as a detector unit which is located near the top of the container 43 and optically detects that the amount of cutting wastes accumulated in the container 43 exceeds a predetermined upper limit. The upper limit sensor 44 can be implemented, for example, with a transmission-type optical sensor consisting of a light emitting device 44a and a light receiving device 44b. When the accumulated amount of cutting wastes increases to block the light emitted from the light emitting device 44a, the upper limit sensor 44, that is a transmission-type optical sensor, detects this increase as a change in the voltage output from the light receiving device 44b.

The sheet processing control unit 60 is responsible for integrally controlling the sheet processing apparatus 20 and can be implemented with a microcomputer mainly including a CPU, memories such as a ROM and a RAM, and a communication I/F. The sheet processing control unit 60 performs various operations in accordance with a control program stored in the ROM, and controls the operation of the sheet processing apparatus 20 on the basis of the operational results.

In the case of the present embodiment, the sheet processing control unit 60 performs the punching operation with an appropriate timing by controlling the punching unit 40, and displays a predetermined warning message on the manipulation unit of the image forming apparatus 10 when it is determined that the amount of cutting wastes accumulated in the container 43 exceeds the predetermined upper limit on the basis of the detection signal output from the upper limit sensor 44. Also, the sheet processing control unit 60 controls the humidifying unit 30 to switch whether to perform, the humidifying operation. This determination is made on the basis of the type of the sheet P and/or the atmospheric humidity.

Figure 5:
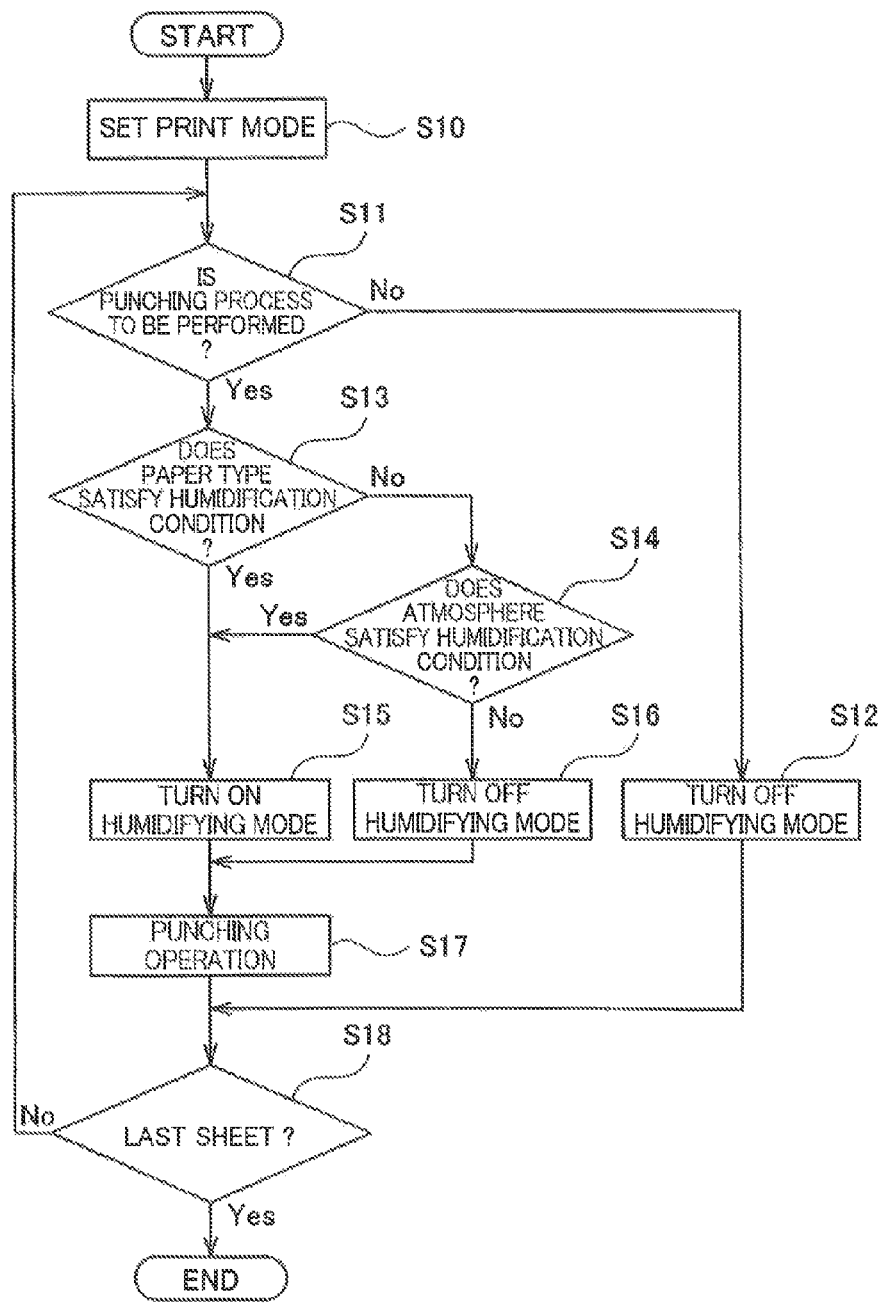
FIG. 5 is a flow chart showing the operation of the sheet processing apparatus in accordance with the first embodiment.

FIG. 5 is a flow chart showing the operation of the sheet processing apparatus 20 in the case of the present embodiment. The routine corresponding to this flow chart is called in response to a command to perform a job, which is input to the image forming apparatus 10, and performed by the sheet processing control unit 60.

First, in step 10 (S10), the sheet processing control unit 60 sets a print mode. More specifically, the sheet processing control unit 60 sets the condition of the sheet processing apparatus 20 on the basis of print information input by a user through the manipulation unit. For example, if the punching process is to be performed, the conveying route of a sheet P is set to the second conveying route R2. Conversely, if the punching process is not to be performed, the conveying route of sheets P is set to the first conveying route R1.

In step 11 (S11), the sheet processing control unit 60 determines whether or not the punching process is to be performed for the sheet P. If the determination is in the negative in step 11, i.e., if the punching process is not to be performed, the process proceeds to step 12 (S12). Conversely, the determination is in the affirmative in step 11, i.e., if the punching process is to be performed, the process proceeds to step 13 (S13).

In step 12, the sheet processing control unit 60 turns off the humidifying mode. The sheet processing control unit 60 can turns off the humidifying mode by changing the positions of the pair of humidifying rollers 31 from engagement positions under pressure to disengagement positions, or disengaging the water supply rollers 32 from the humidifying rollers 31 respectively. By this operation, the humidifying operation of the humidifying unit 30 can be halted.

In step 13, the sheet processing control unit 60 determines whether or not the type of paper satisfies a humidification condition, i.e., whether or not the type of paper is that requires the humidifying operation. The level of the problem encountered with charged cutting wastes depends on the type of paper. For example, in the case of thin paper sheets, the cutting wastes are lightweight so that the problem encountered with charged cutting wastes becomes significant. On the other hand, in the case of plain or heavy paper sheets, the cutting wastes are not so lightweight so that the problem encountered with charged cutting wastes is not significant. Accordingly, the above determination is made to perform the humidifying operation if the type of paper is such that the problem encountered with charged cutting wastes would become significant without the humidifying operation. The humidification condition of the type of paper is determined, for example, that the density of a sheet P is no greater than 70 g/m².

If the determination is in the negative in step 13, i.e., if the type of paper does not satisfy the humidification condition, the process proceeds to step 14 (S14). On the other hand, if the determination is in the affirmative in step 13, i.e., if the type of paper satisfies the humidification condition, the process proceeds to step 15 (S15).

In step 14, the sheet processing control unit 60 determines whether or not the atmosphere satisfies another humidification condition provided for the atmosphere. The level of the problem encountered with charged cutting wastes depends on the atmosphere, more specifically the degree of humidity, around and inside the sheet processing apparatus. For example, in a low humidity condition, a sheet P is likely to be charged and this charged state may easily be maintained, and therefore the problem encountered with charged cutting wastes becomes significant. Conversely, in a high humidity condition, a sheet P is hardly charged, and therefore the problem encountered with charged cutting wastes becomes insignificant. The above determination is thereby provided in order to perform the humidifying operation when the atmospheric humidity is so low as to make significant the problem encountered with charged cutting wastes. For example, a humidity of no higher than 20% can be set as a humidification condition. The atmospheric humidity can be detected by a humidity sensor 45 which is provided in the sheet processing apparatus (refer to FIG. 2).

If the determination is in the affirmative in step 14, i.e., if the atmosphere satisfies the humidification condition, the process proceeds to step 15. Conversely, if the determination is in the negative in step 14, i.e., if the atmosphere does not satisfy the humidification condition, the process proceeds to step 16 (S16).

In step 15, the sheet processing control unit 60 turns on the humidifying mode. When the humidifying mode is turned on, the sheet processing control unit 60 switches the pair of humidifying rollers 31 from the disengagement positions to the engagement positions under pressure, and engages the water supply rollers 32 with the humidifying rollers 31 under pressure respectively. After this process, the humidifying unit 30 performs the humidifying operation.

In step 16, the humidifying mode is turned off. When the humidifying mode is turned off, the sheet processing control unit 60 switches the pair of humidifying rollers 31 from the engagement positions under pressure to the disengagement positions, or disengages the water supply rollers 32 from the humidifying rollers 31 under pressure respectively. The humidifying unit 30 halts the humidifying operation by this operation.

In step 17, the sheet processing control unit 60 performs the punching operation with a predetermined timing when a sheet P arrives at the punching unit 40. This timing when the punching operation is to be performed is determined by detecting the timing with which the sheet P is passed through a predetermined position in the second conveying route R2 by the use of a sheet sensor (not shown in the figure), and estimating the timing with which the sheet P arrives at the punching unit 40 from the detected timing on the basis of the conveying speed of the sheet P.

In step 18 (S18), the sheet processing control unit 60 determines whether or not the sheet P is the last sheet to be handled by the current job. If the determination is in the affirmative in step 18, i.e., if the sheet P is the last sheet, the process ends. Conversely, if the determination is in the negative in step 18, i.e., if the sheet P is not the last sheet so that there is a subsequent sheet to be processed, the process returns to step 11.

In the case of the present embodiment as described above, the sheet processing apparatus 20 is provided, with the punching unit 40 which cuts off part of a sheet P conveyed along the conveying route, and the humidifying unit 30 located on this conveying route in the upstream side of the punching unit 40 and configured to humidify the predetermined area Ra which is selected from the entire area of the sheet P and includes the punch areas Pa to be cut off from the conveyed sheet P by the punching unit 40.

This configuration makes it possible to selectively humidify only the punch area Pa as part of the sheet P including the predetermined area Ra of the sheet P rather than the entire area of the sheet P. The sheet P can thereby be prevented from being excessively wet and being inappropriately conveyed. In addition to this, since the humidifying unit 30 is located in the sheet processing apparatus 20, the sheet P can be made wet before arriving at the punching unit 40 to remove static electricity by the humidifying unit 30 which is located in the vicinity of the punching unit 40. By this configuration, when a sheet P is fed to the punching unit 40, static electricity can be removed from the punch area Pa. The cutting wastes are thereby generated corresponding to the punch area Pa in a discharged state. By this configuration, it is possible to inhibit the undesirable situation that cutting wastes are scattered and attracted to several surfaces, and/or clustered together and locally heaped in the container. As a result, it is also possible to inhibit the undesirable situation that the heap of cutting wastes makes a sensor detect the full state of the container too early.

Incidentally, while the humidifying unit 30 of the present embodiment selectively humidifies the predetermined area Ra of a sheet P which is wider than the punch area Pa and included in this punch area Pa, it is possible to provide a humidifying unit which can selectively humidify only the punch area Pa to be cut off by the punching unit 40 so that the printed sheet is maintained dry after the punch area Pa is cut off. In this case, the predetermined area Ra may be slightly smaller than the punch area Pa so that only part of the punch area Pa is made wet.

Also, the humidifying unit 30 of the present embodiment is implemented with the pair of humidifying rollers 31 which are engaged with each other under pressure to form a nip portion therebetween for supplying a humidifying liquid to a sheet P passing through the nip portion, the pair of water baths 33 for storing the humidifying liquid, and the pair of water supply rollers 32 which are engaged with the pair of humidifying rollers 31 for supplying the humidifying liquid thereto from the pair of water baths 33 respectively.

A sheet P can thereby be supplied the humidifying liquid in an appropriate manner by being passed between the pair of humidifying rollers 31. By this configuration, it is possible to humidify the punch area Pa in an appropriate manner.

Alternatively, in accordance with the present embodiment, the pair of humidifying rollers 31 can be designed to locally form a nip portion in correspondence with the punch area Pa.

In accordance with this configuration, humidification can be limited to the punch area Pa by limiting the humidifying area in the sheet width direction. This makes it possible to avoid excessive humidification and realize minimum humidification required to remove static electricity.

Also, the sheet processing control unit 60 is provided to control the humidifying unit 30 to switch whether to perform the humidifying operation. This configuration makes it possible to switch whether to perform the humidifying operation in accordance with the requirement, for example, in accordance with whether to perform the punching operation. This is effective for avoiding unnecessary humidification particularly in the case where sheets P are always passed through the humidifying unit 30 in the conveying route.

Furthermore, while a sheet P is fed to the punching unit 40 and discharged from the punching unit 40 by a switchback operation in accordance with the present embodiment, the sheet processing control unit 60 performs the humidifying operation, both when the sheet P is fed to the punching unit 40 and when the sheet P is discharged from the punching unit 40. Alternatively, the sheet processing control unit 60 may perform the humidifying operation only when the sheet P is fed to the punching unit 40. In accordance with the former technique, the humidifying operation need not be enabled or disabled when the switchback operation is performed to reverse the direction of conveying a sheet P after feeding the sheet P to the punching unit 40, so that it is possible to perform humidification of the sheet P by simple control. On the other hand, in accordance with the latter technique, the humidifying operation can be halted when the sheet P is discharged from the punching unit 40 so that humidification can be performed with a timing only when required.

The sheet processing control unit 60 controls the humidifying unit 30 to switch whether to perform the humidifying operation on the basis of either or both of the type of the sheet P and the atmospheric humidity. In accordance with this configuration, the humidifying operation is performed only when processing a sheet P which tends to be affected by static electricity or processing a sheet in an environment where static electricity is easily generated, so that humidification can be performed with a timing only when required.

Meanwhile in the case of the above embodiment, the sheet holding plate 23 is used to switch the conveying route after the switchback operation. Alternatively, the mechanism of switching the conveying route can be implemented by arranging the third conveyance unit 21c in an upper location and providing a route switching gate (not shown in the figure) for guiding the leading edge of a sheet P which is returned from the second conveyance unit 21b by a switchback operation to direct the sheet P to the third conveyance unit 21c.

Second Embodiment

Figure 6:
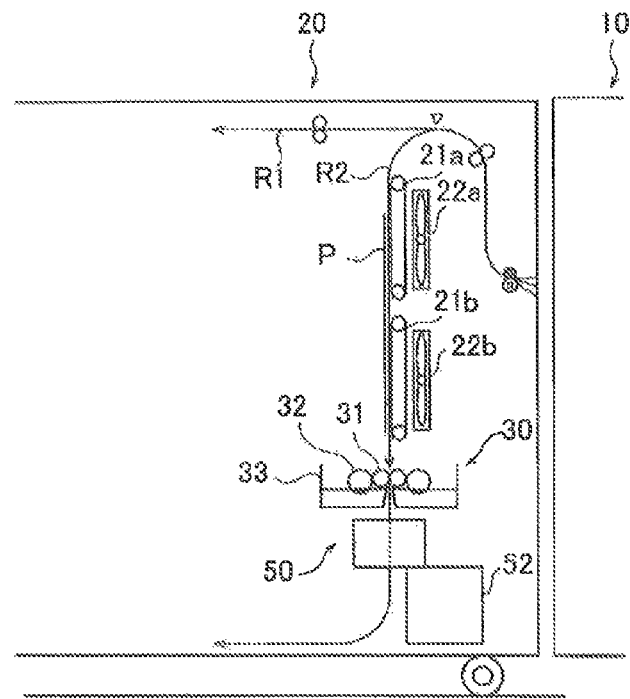
FIG. 6 is an explanatory view for schematically showing a sheet processing apparatus in accordance with a second embodiment of the present invention.

FIG. 6 is an explanatory view for schematically showing a sheet processing apparatus 20 in accordance with a second embodiment of the present invention. The sheet processing apparatus 20 according to the present embodiment is located in the subsequent stage of the image forming apparatus 10, and performs a cutting process to cut off opposite edge areas of a sheet P which is supplied from the image forming apparatus 10. This sheet processing apparatus 20 consists mainly of a humidifying unit 30, a cutting unit 50 as a cutter unit and a sheet processing control unit 60.

This sheet processing apparatus 20 receives a sheet P, which is supplied from the image forming apparatus 10, through a sheet receiving unit. The sheet P received through the sheet receiving unit is supplied to a first conveying route R1 or a second conveying route R2 in accordance with the position of a conveying route switch gate (not shown in the figure). Like the above first embodiment, the conveying route switch gate is controlled to direct a sheet P to the first conveying route R1 when the sheet P is to be discharged without processing, or to the second conveying route R2 when the sheet P is to be processed by the cutting process.

The second conveying route R2 is provided for transferring a sheet P from the sheet receiving unit to the cutting unit 50, and then discharging the sheet P to the catch tray. A plurality of conveyance units 21a and 21b are arranged on the second conveying route R2 as a means for conveying a sheet P along this second conveying route R2. Each of the conveyance units 21a the 21b consists of several parts such as an air suction belt in the same manner as that of the first embodiment.

A sheet P is conveyed by the first conveyance unit 21a located in the sheet receiving side and the second conveyance unit 21b located in the downstream side thereof, passed through the humidifying unit 30, and transferred to the cutting unit 50. After cut out by the cutting unit 50 in the conveying route, the sheet P is conveyed continuously in the same direction and discharged from the cutting unit 50. The sheet P is then transferred to the subsequent stage by a conveyance means which is not shown in the figure.

The humidifying unit 30 consists mainly of a pair of humidifying rollers 31, a pair of water supply rollers 32 and a pair of water baths 33 in the same manner as that of the first embodiment. When the rollers 31 and 32 are driven to feed a sheet P to the cutting unit 50, the sheet P is wholly passed between the humidifying rollers 31 from the leading edge to the tail edge.

Figure 7:
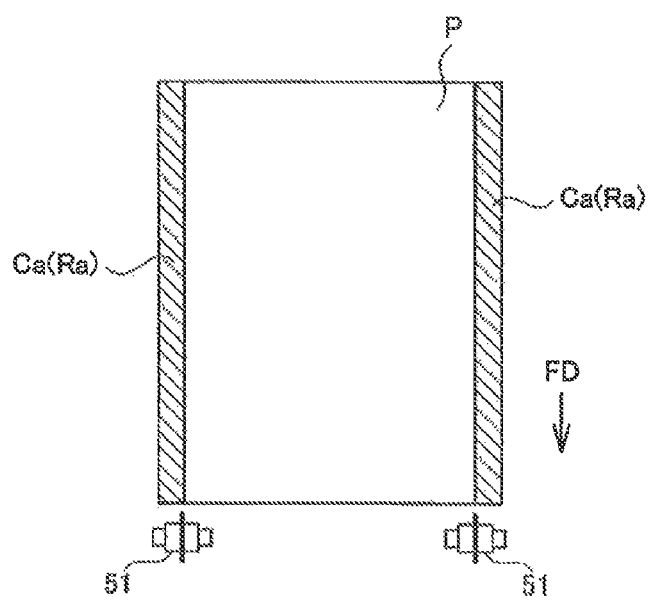
FIG. 7 is a view for explaining a cutting unit shown in FIG. 6 and a sheet to be cut out by the cutting unit.

The humidifying rollers 31 of the present embodiment have different diameters in the sheet width direction FD to partially engage with each other to form discrete nip portions located in correspondence with cut areas Ca to be described below. In this case, as illustrated in FIG. 7, predetermined areas Ra of the sheet P are selectively made wet in the left and right sides of the sheet P in the sheet width direction perpendicular to the sheet conveying direction FD. This predetermined areas Ra correspond to the cut areas Ca to be cut off by the cutting unit 50.

The cutting unit 50 consists mainly of a pair of cutters 51 and used to cut off the cut areas Ca as cut areas which are part of the sheet P. For example, the cut areas Ca are defined as edge areas located in the left and right sides of the sheet P and having a predetermined width and a length corresponding to the length of the sheet P in the sheet conveying direction FD. The pair of cutters 51 of this cutting unit 50 are provided in correspondence with the cut areas Ca respectively and located distant from each other in the sheet width direction. The cut areas Ca are cut off by a cutting operation, i.e., feeding a sheet P to the cutters 51, which are provided with blades respectively, as the sheet P is conveyed.

After cut off from the sheet P by the cutters 51, the cut areas Ca fall down into a container 52 located below the cutter 51 in the vertical direction and are heaped as cutting wastes. The container 52 is a box-like container having an upper opening, and provided with an upper limit sensor (not shown in the figure) which optically detects that the amount of cutting wastes accumulated in the container exceeds a predetermined upper limit in the same manner as that of the first embodiment.

In accordance with the present embodiment as described above, the sheet processing apparatus 20 is provided with the cutting unit 50 which cuts off part of a sheet P conveyed along the conveying route, and the humidifying unit 30 located on this conveying route in the upstream side of the cutting unit 50 and configured to selectively humidify the cut areas Ca to be cut off from the conveyed sheet P by the cutting unit 50. Namely, the humidifying unit 30 is provided for selectively humidify the cut areas Ca in the entire area of the sheet P.

This configuration makes it possible to selectively humidify only the predetermined areas Ra corresponding to the cut areas Ca as part of the sheet P rather than the entirety of the sheet P. The sheet P can thereby be prevented from being excessively wet and being inappropriately conveyed. In addition to this, since the humidifying unit 30 is located in the sheet processing apparatus 20, the cut areas Ca can be made wet (electrostatically discharged) in the upstream side of the cutting unit 50, and thereby can arrive at the cutting unit 50 in an electrostatically discharged state. Because of this, the cutting wastes are generated corresponding to the cut areas Ca in an electrostatically discharged state. By this configuration, it is possible to inhibit the undesirable situation that cutting wastes are scattered and attracted to several surfaces, and/or clustered together and locally heaped in the container. As a result, it is also possible to inhibit the undesirable situation that the heap of cutting wastes makes a sensor detect the full state of the container too early.

The foregoing description has been presented on the basis of the image forming system according to the present invention. However, it is not intended to limit the present invention to the precise form described, and obviously many modifications and variations are possible within the scope of the invention. Also, the sheet processing apparatus can be combined not only with an image forming apparatus but also with any other appropriate apparatus, and can be used alone to serve as an embodiment of the present invention. Furthermore, in the case of the above embodiments, the sheet processing apparatus and the image forming apparatus are provided as separate apparatuses. However, the functions of these apparatuses can be integrally implemented within a single apparatus.

Anyway, in accordance with the present invention, when a sheet is fed to the cutter unit, static electricity can be removed from the cut area. The cutting wastes are thereby generated corresponding to the cut areas in a discharged state. By this configuration, it is possible to inhibit the undesirable situation that cutting wastes are scattered and attracted to several surfaces, and/or clustered together and locally heaped in the container.

The invention claimed is:

1. A sheet processing apparatus comprising:
   a cutter unit configured to cut off a cut area which is part of a sheet conveyed in a sheet conveying direction along a conveying route; and
   a humidifying unit located on said conveying route in the upstream side of said cutter unit and configured to partially humidify said sheet to selectively humidify said cut area,
   wherein said humidifying unit selectively humidifies in a sheet width direction perpendicular to the sheet conveying direction, from among the entire area of said sheet, only said cut area or a predetermined area of said sheet including said cut area, and
   wherein said humidifying unit comprises a pair of rotary members engaged with each other under pressure to form a nip portion therebetween and configured to provide a humidifying liquid for a sheet which is passed between said nip portion, and a supply unit configured to supply said pair of rotary members with said humidifying liquid.

2. The sheet processing apparatus of claim 1 wherein said pair of rotary members are partially engaged in order to form said nip portion which is narrower than the width of the sheet corresponding to said cut area of the sheet.

3. The sheet processing apparatus of claim 1 further comprising a control unit configured to control said humidifying unit to switch whether to perform a humidifying operation.

4. The sheet processing apparatus of claim 3 wherein the sheet is fed to said cutter unit and then discharged from said cutter unit by a switchback operation, and said control unit performs the humidifying operation when the sheet is fed to said cutter unit.

5. The sheet processing apparatus of claim 4 wherein said control unit performs the humidifying operation also when the sheet is discharged from said cutter unit.

6. The sheet processing apparatus of claim 3 wherein said control unit controls said humidifying unit to switch whether to perform a humidifying operation in accordance with the type of the sheet.

7. The sheet processing apparatus of claim 3 wherein said control unit controls said humidifying unit to switch whether to perform a humidifying operation in accordance with the atmospheric humidity.

8. The sheet processing apparatus of claim 1 further comprising:
   a container located below said cutter unit and having an upper opening to receive and accumulate cutting wastes of said cut area which is cut off by said cutter unit; and
   a detector unit located near the top of said container and configured to optically detect that the amount of the cutting wastes accumulated in said container exceeds a predetermined upper limit.

9. The sheet processing apparatus of claim 1 wherein the humidifier humidifies an entire portion of the cut area, whereby static electricity on the cut area is removed.

10. An image forming system comprising:
    an image forming apparatus configured to form, an image on a sheet; and
    a sheet processing apparatus configured to process a sheet which is fed from said image forming apparatus,
    said sheet processing apparatus comprising:
    a cutter unit configured to cut off a cut area which is part of a sheet conveyed in a sheet conveying direction along a conveying route; and
    a humidifying unit located on said conveying route in the upstream side of said cutter unit and configured to selectively humidify said out area of said sheet,
    wherein said humidifying unit selectively humidifies in a sheet width direction perpendicular to the sheet conveying direction, from among the entire area of said sheet, only said cut area or a predetermined area of said sheet including said cut area, and
    wherein said humidifying unit comprises a pair of rotary members engaged with each other under pressure to form a nip portion therebetween and configured to provide a humidifying liquid for a sheet which is passed between said nip portion, and a supply unit configured to supply said pair of rotary members with said humidifying liquid.

11. The sheet processing apparatus of claim 10, wherein said pair of rotary members are partially engaged in order to form said nip portion which is narrower than the width of the sheet corresponding to said cut area of the sheet.

* * * * *